United States Patent [19]
Whitney

[11] Patent Number: 5,323,594
[45] Date of Patent: Jun. 28, 1994

[54] GRAIN HARVESTER

[75] Inventor: Richard W. Whitney, Stillwater, Okla.

[73] Assignee: Board of Regents for the Oklahoma Agricultural & Mechanical College acting for & on behalf of Oklahoma State University, Stillwater, Okla.

[21] Appl. No.: 994,550

[22] Filed: Dec. 21, 1992

[51] Int. Cl.$^5$ .............................................. A01D 45/30
[52] U.S. Cl. .......................................... 56/126; 56/16.6
[58] Field of Search ................. 56/13.1, 13.2, 13.3, 56/16.6, 126, 128, 130, 364, DIG. 12

[56] References Cited

U.S. PATENT DOCUMENTS

| | | | |
|---|---|---|---|
| 2,345,969 | 4/1944 | Halley et al. | 56/128 |
| 3,818,686 | 6/1974 | Haffner et al. | 56/11.1 |
| 4,373,322 | 2/1983 | Beisel | 56/126 |
| 4,631,909 | 12/1986 | McLane | 56/202 |
| 4,791,779 | 12/1988 | Hoffman | 56/202 |
| 4,924,664 | 5/1990 | Hicks et al. | 56/202 |
| 5,044,147 | 9/1991 | Klinner | 56/364 X |
| 5,138,825 | 8/1992 | Trefz et al. | 56/11.1 |

FOREIGN PATENT DOCUMENTS

| | | | |
|---|---|---|---|
| 934970 | 6/1982 | U.S.S.R. | 56/126 |
| 2101864 | 1/1983 | United Kingdom . | |

Primary Examiner—Ramon S. Britts
Assistant Examiner—James A. Lisehora
Attorney, Agent, or Firm—Head and Johnson

[57] ABSTRACT

A grain harvester for propulsion by a tractor over a field of grain growing on upwardly extending plant stems, the harvester having a housing supported and movable in a direction of travel over a field of grain by a tractor, an elongated cylindrical brush supported by the housing and rotating about a horizontal axis that is transverse to the housing direction of travel, the brush having bristles extending generally radially therefrom, shield members supported by the housing in planes parallel the brush rotational axis, the shield members providing an elongated air and grain intake opening, an air discharge opening and a grain discharge opening, the openings being spaced apart from each other, a grain bin supported by the harvester housing and connected with the grain discharge opening, the brush being rotated as the harvester is moved to draw air and grain into the housing through the air and grain intake opening and to dispel grain through the grain discharge opening into the grain bin, and to dispel air out the air outlet opening, the air outlet opening providing greater air velocity flow through the housing to more effectively gather and collect grain for deposit in the grain bin.

5 Claims, 3 Drawing Sheets

GRAIN HARVESTER

BACKGROUND OF THE INVENTION

This invention relates to a grain or seed harvester of the type illustrated and described in detail in U.S. Pat. No. 4,373,322 issued Feb. 15, 1983 and entitled "Flail Vacuum Seed Harvester". U.S. Pat. No. 4,373,322 is incorporated herein by reference. The seed harvester as illustrated and described in issued U.S. Pat. No. 4,373,322 provides an effective and efficient means for gathering seeds and grains and is particularly useful for harvesting grass seeds and other seeds that are relatively small compared to a typical grain, such as oat, wheat, barely and so forth. The harvester as described in this patent utilizes a horizontally supported cylindrical brush rotated about a horizontal axis that is transverse to the path of movement of the harvester over a field of grain. The term "grain" as used herein means seed and/or grain and means small seed or grain of the type that grows on upwardly extending stems or stalks and that is commonly harvested for use as seeds or for consummation by animals or humans. The most common application of the harvester of this invention is that for harvesting grass seeds, but the invention is not limited to this specific application and, thus, it will be described as a "grain harvester".

The harvester as described in U.S. Pat. No. 4,373,332 utilizes a rotating cylindrical brush having bristles extending radially therefrom mounted within a harvester housing, with upper and lower shield members partially surrounding the cylindrical brush. The shield members extend transverse to the path of travel of the harvester and provide a front air and grain inlet opening between the shield members and a rearward air and grain discharge opening. The discharge opening communicates with the grain bin.

The harvester as illustrated and described in U.S. Pat. No. 4,373,332 functions very successfully. However, one problem is that the harvester depends upon air movement. The rapidly rotating cylindrical brush causes air to be drawn into the air and grain inlet opening, and at the opening the brush creates a vacuum air pressure. The air pressure turns to a positive air pressure at the grain outlet opening to the grain bin. Since the air and grain discharge occurs through a single opening there is a tendency to create backup air pressure that reduces the overall air flow velocity. Since the air flow velocity is important in carrying grain from the stalks on which the grain grows, past the brush and into the grain bin, it is important that the air velocity be maintained as high as possible. The present invention is an improvement over the harvester of U.S. Pat. No. 4,373,332. The improvement consists primarily in the arrangement of shield members that surround the rotating cylindrical brush, providing an extra opening communicating with the brush circumferential area. The extra opening serves as an air discharge opening that is separate and distinct from the grain discharge opening to thereby permit higher air flow velocities along the periphery of the brush to increase grain collection efficiencies.

BRIEF SUMMARY OF THE INVENTION

This invention relates to improvements in an existing and successful flail vacuum seed harvester as fully and completely described in U.S. Pat. No. 4,373,332. The harvester is mounted on the front of a tractor by arms pivotally extending from the tractor and hydraulically controlled so that the harvester can be raised and lowered with respect to the earth's surface. The harvester includes a housing in which the mechanisms that function to gather grain from upwardly extending stems of plants are located. While the harvester is useable for a wide variety of applications, it is particularly and uniquely adapted for gathering grain in the form of seeds of plants having the characteristic of producing very fine seeds. A specific example of an application of the harvester is for gathering grass seeds, such as bermuda grass seeds, crab grass seeds, and so forth.

The harvester frame supports a rotatable cylindrical brush, the brush being rotated about a horizontal axis that is positioned above the earth's surface. The brush has bristles that extend generally radially outwardly therefrom. The frame includes an upper shield member having a forward, an intermediate and a rearward portion. The intermediate portion is in close proximity to the bristles of the brush as it is rotated. The forward and rearward portions are spaced slightly away from the brush. The frame also includes a lower shield member that is arcuately configured to closely space the cylindrical area generated by the rotation of the bristles extending from the brush. The spacing between the upper and lower shield members provides, at the front of the housing, an air and grain intake opening and toward the rearward portion of the housing, an air and grain discharge opening.

Formed as a part of the housing is a grain bin that collects the grain as it is carried by the air stream movement by the rotating brush. A bin opening is provided in the bin so that air escapes from the bin.

The existing harvesters work well. However, experience with a harvester indicates its effectiveness and efficiency in gathering grain, and particularly small seeds, depends to a great extent on velocity of the air flow produced by the rotating brush. As air is moved by the rotating brush it creates a vacuum at the air and grain intake opening in the front of the harvester. However, the air becomes positive at the air outlet opening between the upper and lower shield members and this positive air pressure tends to reduce the overall air velocity.

The present invention is an improvement in the existing harvester apparatuses. The present invention provides a means of increasing the air flow velocity and to thereby improve the effectiveness and efficiency of the grain harvester.

To achieve this purpose, the harvester employs a housing having three shield members, that is, an upper shield member, a lower shield member and a rearward shield member. The upper and lower shield members have, as does the existing harvester, an air and grain intake opening in the front of the housing into which air having grain entrained therein is drawn into the housing by the rotating brush. The invention also has, as does the existing harvester, a grain discharge opening. However, in the present embodiment the grain discharge opening is formed between the upper shield and the rearward shield. The discharge grain passes into a grain collecting bin. A unique feature of the present invention is the provision of an air discharge opening between the lower shield and the rearward shield. This air discharge opening provides an additional elongated space for passing air away from the rotating brush. The provision of the air discharge opening tends to reduce the back pressure on the air flow stream and to thereby cause the air flow velocity at the air and grain intake to increase. This increased air flow velocity thereby more effectively and efficiently presses the grain stalks against the rotating brush, improving the stripping action and carrying with it grain, including specifically very small seeds that are dislodged from plants by the action of the brush as the harvester moves over a grain field.

A better understanding of the invention will be had by reference to the following description and claims, taken in conjunction with the attached drawings.

DESCRIPTION OF THE DRAWINGS

FIG. 1 is substantially identical to FIG. 3 of this prior issued patent and illustrates the state of the art to which this present invention is applied.

DESCRIPTION OF THE PREFERRED EMBODIMENT

Figure 3:
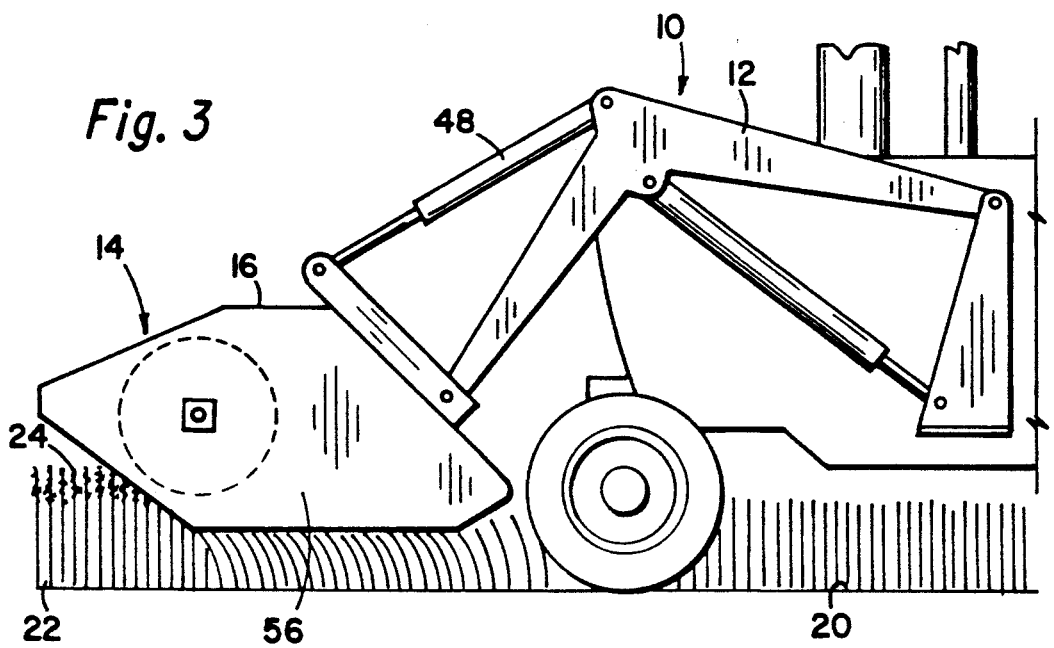
FIG. 3 is an elevational view showing the forward portion of the tractor and showing, more or less diagrammatically, the grain harvester of the present invention as supported to the tractor so that the harvester is supported above the earth's surface as it is moved across a grain field to gather grain from the field crop.

Referring first to FIG. 3, the basic environment in which the grain harvester of this invention is used is illustrated. The harvester is affixed to a farm tractor, generally indicated by the numeral 10. The farm tractor includes support arms 12 that are selectably hydraulically pivoted from the tractor. The support arms 12 may be typically of the type as used on a front-end loader or for elevationally controlling other farm implements that are attached to the front of the tractor. Supported on the outer end of arms 12 is a grain harvester of this invention, generally indicated by the numeral 14. Harvester 14 includes a housing 16 that will be described in greater detail subsequently.

Figure 1:
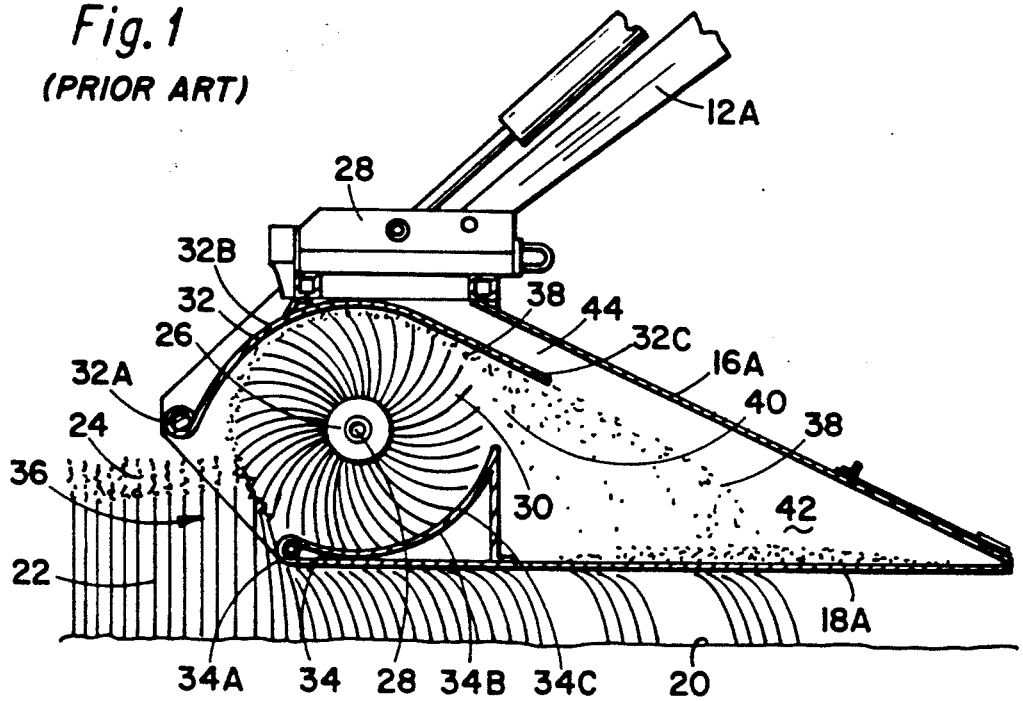
FIG. 1 is a cross-sectional view of the prior art harvester as shown in U.S. Pat. No. 4,373,322.

Turning now to FIG. 1, there is shown a harvester that represents the state of the current technology. This harvester is of the type fully illustrated and described in U.S. Pat. No. 4,373,322. It is a harvester that is supported by an arm 12A in the same way as described with reference to FIG. 3. The harvester has a housing 16A. Housing 16A has a bottom 18A that is supported above the earth's surface 20. Growing on the earth's surface is a crop, such as bermuda grass, formed of generally upwardly extending stems 22 and having seeds 24 growing thereon. Seeds 24 will be described herein generally as "grain", that is, the harvester of this invention can be used with what is commonly termed "grain" or what is commonly termed "seed". The only difference between the terms is that normally "grain" refers to seeds produced by plants that are for animal or human consumption, whereas "seeds" are for planting purposes rather than consumption. To avoid using the term "grain and/or seeds" the term "grain" as used hereinafter and in the claims is intended to mean either grain or seed.

The prior art harvester (FIG. 1) has a cylindrical brush 26 that is rotated about a horizontal axis 28. Brush 26 has bristles 30 extending generally radially outwardly therefrom.

The frame 16A supports an upper longitudinally extending shield 32. The shield 32 has a forward portion 32A, an intermediate portion 32B, and a rearward portion 32C. The intermediate portion 32B is supported in close proximity to bristles 30 as brush 26 is rotated.

Supported by the housing is a lower shield 34 having a forward portion 34A, an intermediate portion 34B, and a rearward portion 34C. Positioned between the upper shield forward portion 32A and the lower shield portion 34A is a space providing an air and grain intake opening 36. As brush 26 is rotated, air is drawn into the housing between upper and lower shields 32A, 34A, that is, a vacuum is created in the area of the air and grain intake opening 36. This vacuum pulls dislodged grain 38 into the space between the shields. As the brush rotates, grain 38 is moved by the brush, and the air and grain pass from between the shields through an air and grain discharge opening 40. Grain 38 falls downwardly into a collection bin 42. The fraction of the air that is moved by the rotating brush which enters the collection bin passes out of the bin 42 through an upwardly extending exhaust 44.

Figure 2:
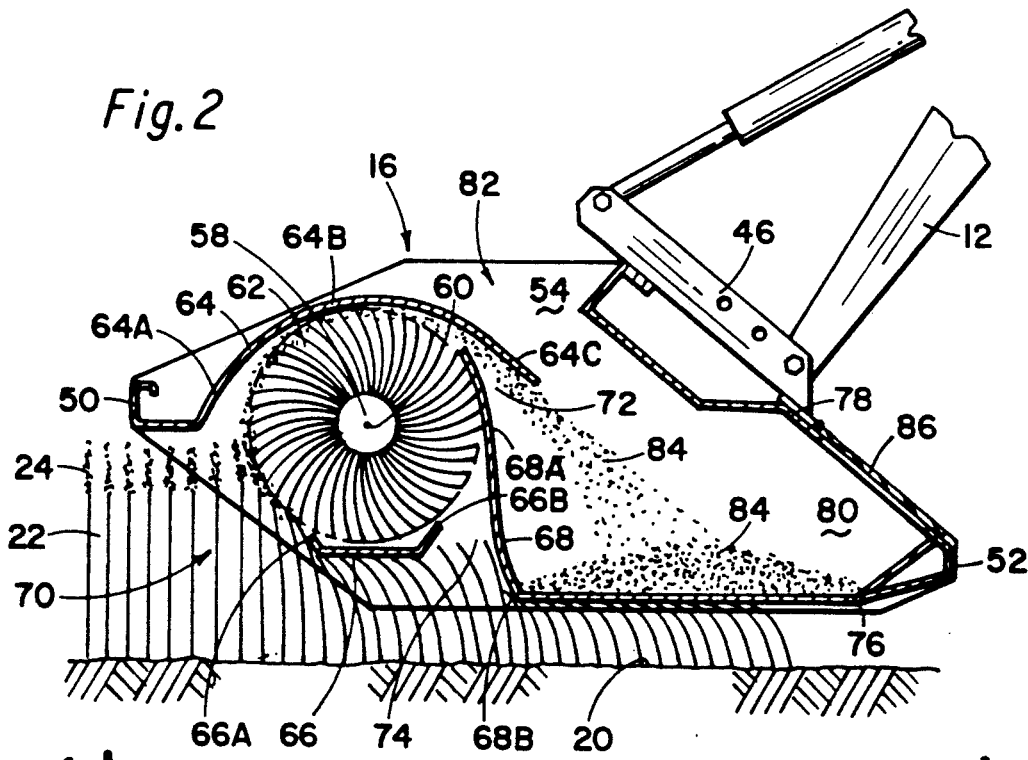
FIG. 2 is a cross-sectional view of an embodiment of a harvester according to the present invention and is arranged to illustrate the differences in principle between the harvester of the present invention and the prior art as illustrated in FIG. 1.
Figure 4:
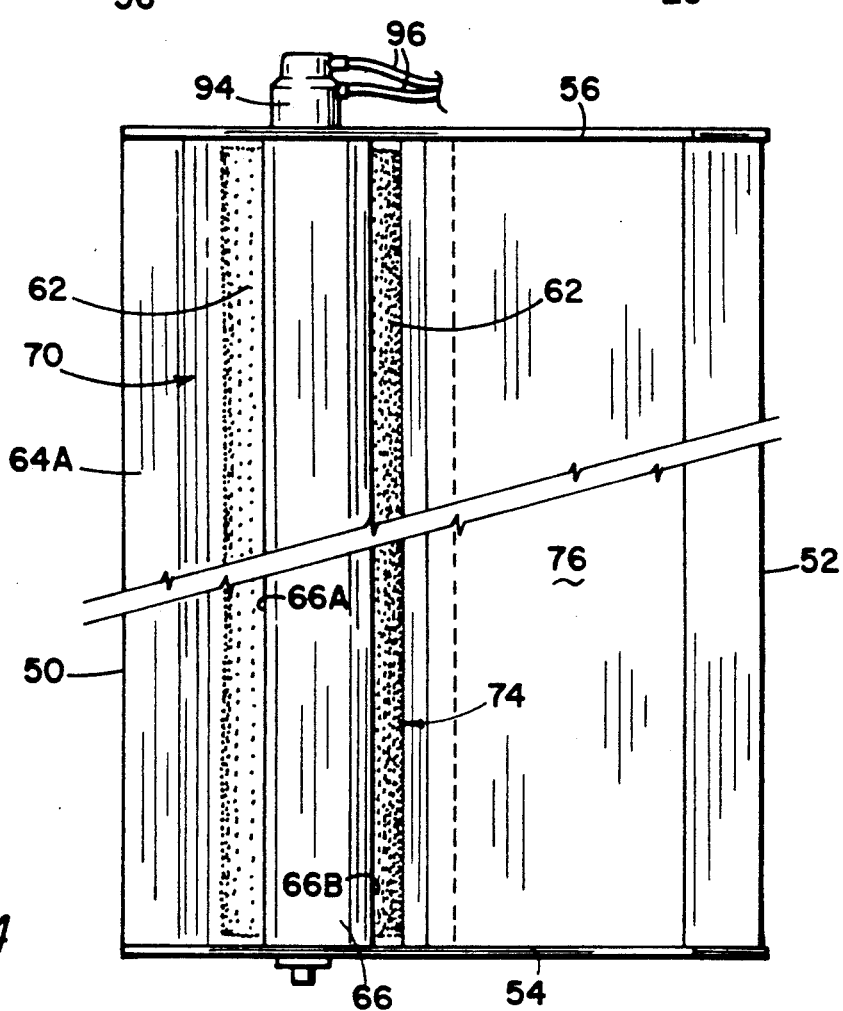
FIG. 4 is a bottom plan view of the harvester of this invention as taken along the line 4—4 of FIG. 2. This bottom plan view shows the provision of an air discharge opening that is a fundamental difference between the present invention and the prior art.

The effectiveness and efficiency of the prior art machine of FIG. 1 is controlled, at least to a certain extent, by the velocity of air that flows through the air and grain intake opening 36 and out the air and grain discharge opening 40. Referring to FIGS. 2 and 4, the improved grain harvester of this invention will be described. The harvester is supported on tractor arms 12 as previously indicated. As shown in FIG. 2, the harvester housing 16 has spaced apart brackets 46, only one of which is seen in FIG. 2. Arm 12 is attached to brackets 46 and the pivotal relationship of the harvester housing 16 with respect to the earth's surface 20 is controlled by a cylinder piston 48. The housing 16 has a forward end 50, a rearward end 52, a right side panel 54 (seen in FIG. 4) and a left-side panel 56. A rotatable brush 58 is supported horizontally in the housing between end panels 54 and 56, the brush rotating about a horizontal axis of rotation 60. The brush has bristles 62 extending generally radially therefrom. The function of brush 58 is to encounter and dislodge seeds 24 that are produced by growing plants from upwardly extending stems 22. Thus, the harvester described up to this point is essentially the same as that of the prior art.

The harvester housing 16 includes an upper shield member 64. The upper shield member has a forward portion 64A, an intermediate portion 64B and a rearward portion 64C. The intermediate portion 64B is in close proximity to bristles 62 as the cylindrical brush 58 rotates.

Also extending between the end panels 54 and 56 is a lower shield member 66 having a forward end 66A and a rearward end 66B. Thus, the lower shield member 66 is generally paralleled to and spaced below upper shield member 64 with brush 58 therebetween.

Also supported by housing 16 between end panels 54 and 56 is a rearward shield member 68. The rearward shield member has an upper shield portion 68A and a lower portion 68B. The upper portion 68A of rearward shield 68 is, in part, arcuate about the axis 60 of brush 58, and such arcuate portion is adjacent to the bristles of brush 58 as the brush is rotated.

Between the upper shield forward portion 64A and the lower shield forward end 66A is an air and grain intake opening 70. Between upper shield rearward end 64C and rearward shield upper portion 68A is a grain discharge opening 72. Between lower shield rearward end 66B and rearward shield lower portion 68B is an air discharge opening 74.

Extending between housing end plates 54 and 56 is a housing bottom 76 that connects with the rearward shield lower portion 68B, and a housing rearward wall 78 extends between end plates 54 and 56 and connects with the housing bottom 76 to thereby form a grain bin 80. Between rearward wall 78 and upper shield rearward portion 64C is an exhaust opening 82.

METHOD OF OPERATION OF THE GRAIN HARVESTER

With cylindrical brush 58 rapidly rotating, the harvester is moved over a field of land 20 having stems or stalks 22 of growing plants extending upwardly therefrom with grain 24 on the stalks. As the rotating brush contacts the grain, the grain moves into contact with the brush between the opposed vertically extending end plates 54 and 56, the grain is dislodged from stalks 22. The rapidly rotating action of the brush creates air flow that produces a vacuum in the air and grain intake opening 70. This vacuum pulls the dislodged grain with it, and the grain is moved upwardly and between the bristles of brush 58 and upper shield 64. The grain is moved by the effect of air velocity created by the brush. The brush bristles preferably do not physically contact the upper shield 64 but are preferably spaced about ¼ inch from it, leaving an area therebetween of high air velocity that carries grain with it. The grain is carried by air velocity and by centrifugal force to pass through grain discharge opening 72 and into grain bin 80. The grain is indicated by the numeral 84, that is, grain 24 after it has been separated from stalks or stems 22 on which it has grown and which has been harvested by removal therefrom and deposited into grain bin 80. The rapid rotation of cylindrical brush 58 moves air with it, and a significant portion of the air moved by the brush is expelled downwardly and outwardly through the air discharge opening 74 that is established between rearward shield 68 and bottom shield 66. The provision of discharge opening 74 substantially reduces the back pressure on the air flow stream which, in turn, results in a higher velocity air flow through air and grain intake opening 70 to thereby more effectively and efficiently pick up the dislodged grain and move it through grain discharge opening 72 and into grain bin 80. Air entering grain bin 80 through air discharge opening 72 passes out of the grain bin through the relatively large exhaust opening 82 to help further reduce the back pressure on the air flow stream and increase the velocity thereof.

As with the prior art, an access door 86 is provided in the housing rearward wall 78 so that collected grain may be removed.

Figure 5:
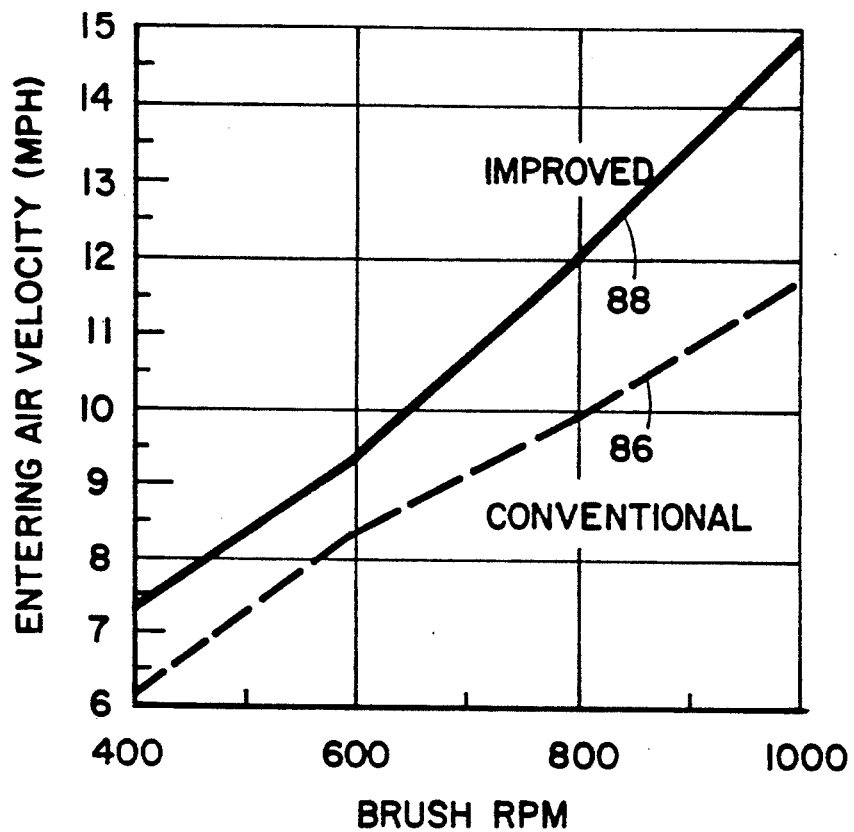
FIG. 5 is a chart showing Entering Air Velocity versus "Brush RPM" and showing the difference between the entering air velocity as achieved by a machine of the type illustrated in FIG. 1 that is termed "Conventional" and the machine of the present invention as illustrated in FIG. 2 that is labeled "Improved".
Figure 6:
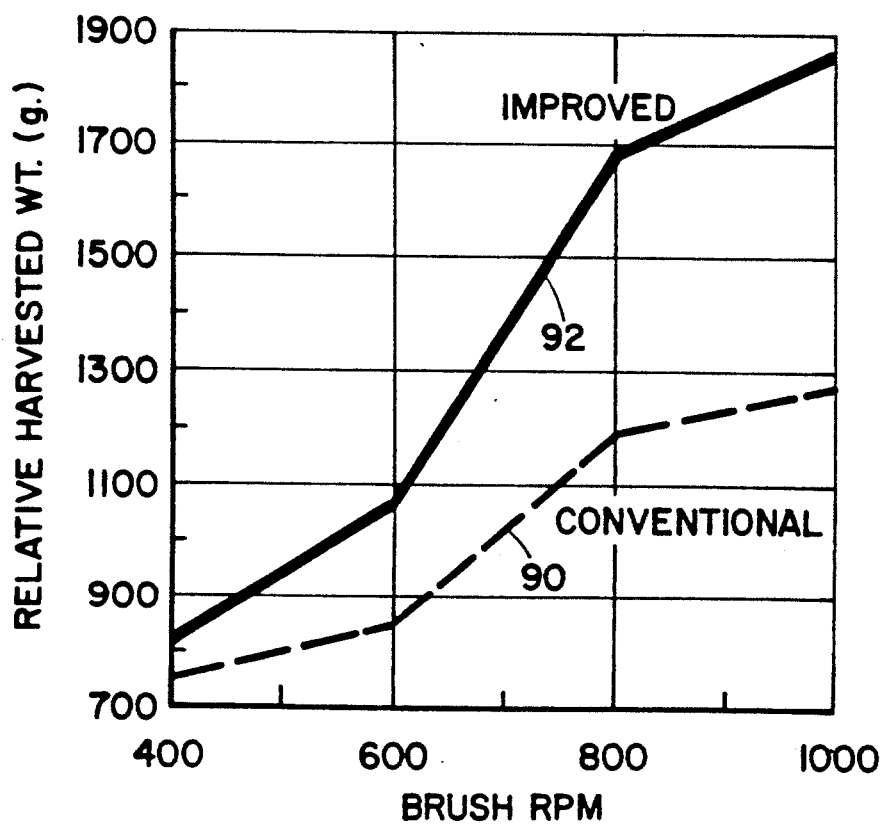
FIG. 6 is a chart that shows the "Relative Harvested Weight" of a grain crop versus "Brush RPM". The chart shows the relative harvested crop for the machine as in FIG. 1 labeled "Conventional" and the relative weight of the harvested crop of the machine of the type illustrated in FIGS. 2 and 4 that is an embodiment of the present invention. The chart of FIG. 6 has been generated to attain the "Conventional" data by moving a machine of the type as shown in FIG. 1 over a selected area of a grain crop at different brush rpm, while the data for providing the chart labeled "improved" has been obtained by moving a machine of the type as shown in FIGS. 2 and 4 over the same crop land. Recognized statistical procedures were employed to ensure that differences measured were real and significant.

The improved effectiveness of the invention is illustrated in FIGS. 5 and 6. FIG. 5 shows the results obtained by tests using brush rpm to determine entering air velocity in miles per hour. As the brush rpm increases the air velocity increases in almost a directly proportional manner as illustrated in the drawings. The air velocity of the conventional harvester, which is substantially the harvester as illustrated and described in U.S. Pat. No. 4,373,322, is indicated by the graph 86, whereas graph 88 shows the higher entering air velocities for the same rpm utilizing the improved harvester of the present invention. The increased entering air velocity is attained by the provision of the auxiliary air discharge opening 74.

The improved air velocity results in greater crop harvesting efficiency as illustrated in FIG. 6. This figure represents data taken with machines of the prior art type, the graph 92 shows the increased harvesting efficiency in grams for a given harvested area versus the rpm of the brush of the conventional machine as represented by U.S. Pat. No. 4,373,322. The harvesting efficiency of the improved machine as shown in FIGS. 2 and 4 is illustrated by graph 92. Graph 92 illustrates the fact that increased air velocity carries with it a greater proportion of the dislodged grain that is ultimately collected in grain bin 80.

FIG. 4 shows a bottom view of the grain harvester of FIG. 2 showing housing bottom 76, bristles 62 of brush 58, lower shield 66 with forward ends 66A and 66B thereof and forward portion 64A of the upper shield. FIG. 4 also shows air and grain intake opening 70 and air discharge opening 74.

A means must be provided for rapidly rotating cylindrical brush 58. Means illustrated in FIG. 4 includes the use of a hydraulic motor 94 as actuated by hydraulic fluids supplied from the tractor by means of hydraulic hoses 96. This is illustrative of one means of rotating the brush. The brush could also be rotated by direct power coupling to the front take-off or the like and the specific means for rotating the brush is not a part of the invention.

The claims and the specification described the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A grain harvester for propulsion by a tractor having a direction of travel over a field of grain, the grain growing on upwardly extending plant stems, the harvester comprising:
   an elongated harvester housing having means to be supported by and movable over a field of grain by a tractor, the housing extending transverse to the direction of travel and having a front end, a rear end and opposed right and left sides;
   an elongated cylindrical horizontally positioned brush supported by said housing and rotatable about an axis, the brush having bristles extending generally radially therefrom;
   an elongated upper shield member supported by said housing and extending at least substantially between said housing sides, the shield member having a forward portion, a rearward portion and an intermediate portion, the intermediate portion being at least in substantial engagement with said brush bristles, the forward and rearward portions arching away from said brush cylindrical axis and away from said brush bristles;
   an elongated lower shield member supported by said housing and extending at least substantially between said housing sides, the lower shield member being supported parallel to and below said upper shield member and said brush and in close proximity to said brush bristles, the lower shield having a front edge and a rearward edge, there being a grain intake opening between the lower shield member front edge and said upper shield member forward portion;
   an elongated rearward shield member supported by said housing and extending at least substantially between said housing sides and having an upper edge and a lower portion, the rearward shield member extending parallel to said cylindrical brush and having an upper portion adjacent and below said upper edge that is in part, arcuate about the brush axis and in close proximity to said brush bristles, said rearward shield member upper edge being spaced parallel to and below said upper shield member providing an elongated grain discharge opening, and said lower portion being spaced rearwardly of said lower shield member rearward edge providing an elongated air discharge opening between said rearward shield member lower portion and said lower shield member rearward edge;
   a grain bin supported by said housing and extending at least substantially between said housing sides and in communication with said grain discharge opening to receive and store harvested grain therein; and
   means to rotate said brush as the grain harvester is moved by a tractor over a field.

2. A grain harvester according to claim 1 wherein said upper shield member is, at least in part, generally cylindrical about a cylindrical axis coaxial with said brush axis.

3. A grain harvester for propulsion by a conveyance having a direction of travel over a field of grain growing on upwardly extending plant stems, the harvester comprising:
   a harvester housing having means to be supported by and movable in a direction of travel over a field of grain by said conveyance;
   an elongated cylindrical brush supported by said housing and rotatable about a horizontal axis that is transverse to said housing direction of travel, the brush having bristles extending generally radially therefrom;
   three shield members supported by said housing in planes parallel to said brush rotational axis, each shield member having at least a portion that is arcuate about said brush horizontal axis and that is in close proximity to said brush bristles, the three shield members being spaced apart from each other and providing an elongated air and grain intake opening, an air discharge opening and a grain discharge opening;
   a grain bin supported by said harvester housing and in communication with said grain discharge opening; and
   means to rotate said brush as the grain harvester is moved by a conveyance over a field.

4. A grain harvester according to claim 3 wherein said shield members are formed by at least an upper shield member, a lower shield member and a rearward shield member, each shield member having at least one portion in proximity to said brush bristles.

5. A grain harvester according to claim 4 wherein at least one of said shield members at least one portion in proximity to said brush bristles is, at least in part, cylindrical about said brush axis of rotation.

* * * * *